United States Patent [19]

Highbloom

[11] Patent Number: 5,623,403
[45] Date of Patent: Apr. 22, 1997

[54] SYSTEM FOR PROACTIVELY AND PERIODICALLY IDENTIFYING NONCOMPLIANCE WITH MOTOR VEHICLE REGISTRATION LAWS

[75] Inventor: Lawrence Highbloom, Wynnewood, Pa.

[73] Assignee: Vintek, Inc., Wynnewood, Pa.

[21] Appl. No.: 438,815

[22] Filed: May 11, 1995

[51] Int. Cl.[6] ........................................... G06F 17/60
[52] U.S. Cl. .................. 395/228; 364/400; 395/231; 395/503
[58] Field of Search ................................. 364/400, 401, 364/409

[56] References Cited

U.S. PATENT DOCUMENTS

| | | | |
|---|---|---|---|
| 4,727,243 | 2/1988 | Savar | 235/379 |
| 4,774,664 | 9/1988 | Campbell et al. | 364/408 |
| 4,857,713 | 8/1989 | Brown | 235/375 |
| 4,914,587 | 4/1990 | Clouse | 364/408 |
| 4,937,742 | 6/1990 | Marshall | 364/401 |
| 4,970,655 | 11/1990 | Winn et al. | 364/479 |
| 4,989,144 | 1/1991 | Barnett, III | 364/419 |
| 5,063,507 | 11/1991 | Lindsey et al. | 364/408 |
| 5,285,383 | 2/1994 | Lindsey et al. | 364/408 |
| 5,323,315 | 6/1994 | Highbloom | 364/408 |
| 5,325,291 | 6/1994 | Garrett et al. | 364/401 |
| 5,351,302 | 9/1994 | Leighton et al. | 380/30 |
| 5,396,233 | 3/1995 | Hofmann | 340/933 |

OTHER PUBLICATIONS

Journal of Accountancy, vol. 175, No. 4, pp. 29–31, Clark, "States get tough on sales tax compliance".
Tax Notes Today, 94 TNI 245–12, Dec. 21, 1994, "IRS developing comprehensive online compliance database network; will include enforcement program files".
PR Newswire, Jan. 27, 1986, "NY State Tax Commissioner reports that a cross–border match using Vermont DMV turned up various tax evasion schemes".
Business Wire, Nov. 9, 1993, "Analysis & Technology: General Systems Solutions".
*The Vintek View* (Vintek, Inc., Phila., PA), Vol. One, No. 3, Third Quarter, 1993, pp. 1–4.
Figel, T., "Use of Auto Insurance Database Grows," *National Underwriter* (May 25, 1987).

*Primary Examiner*—Robert A. Weinhardt
*Assistant Examiner*—Gita Shingala
*Attorney, Agent, or Firm*—Panitch Schwarze Jacobs & Nadel, P.C.

[57] ABSTRACT

A computer-implemented system for proactively and continuously monitoring the compliance of property transaction agents with government registration laws and regulations includes methods and apparatus for receiving on a periodic basis at a central monitoring computer, information regarding property purchases from computers at financing sources, and information regarding property registrations from computers at a governmental entity. The central monitoring computer compares the two sets of information at periodic intervals, detects instances where there are missing or late registrations, or errors in registration information. The governmental entity sets parameters in the central monitoring computer for determining which detected information should be flagged for further attention. The central monitoring computer generates reports of the flagged records to allow the governmental entity to take appropriate action against the agents who were involved in the registration process for failing to comply with the government laws and regulations. The central monitoring computer also automatically generates communications to the noncompliant agents based on the parameters.

20 Claims, 7 Drawing Sheets

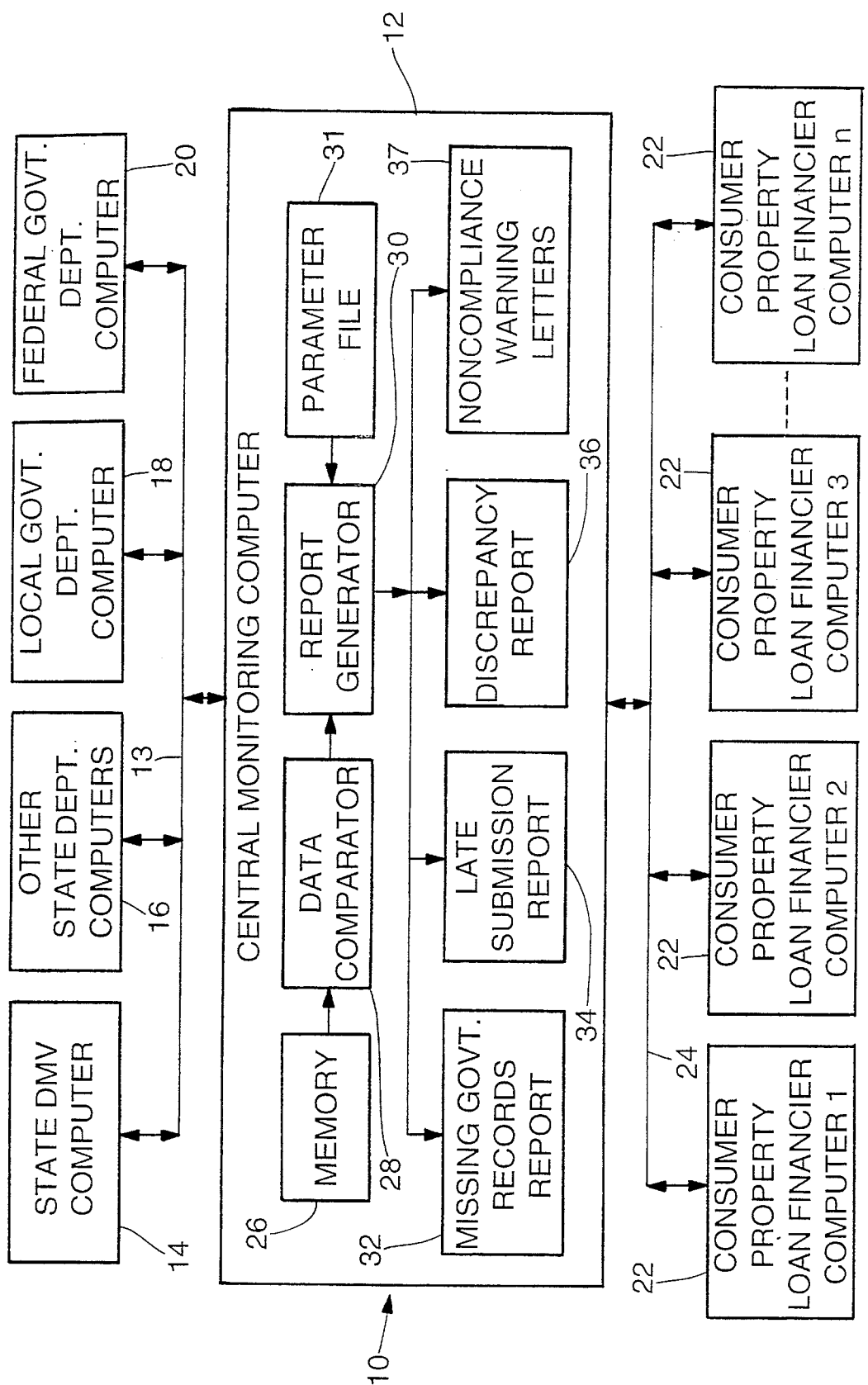

Fig. 2A

RECORD LF12345

| FIELD | DATA |
|---|---|
| 1. VIN | ∿∿∿∿ |
| 2. DEALER (SELLING MERCHANT) | ∿∿∿∿ |
| 3. PURCHASE DATE | ∿∿∿∿ |
| 4. AMOUNT FINANCED | ∿∿∿∿ |
| 5. LIENHOLDER | ∿∿∿∿ |
| 6. LOAN ACCOUNT NUMBER | ∿∿∿∿ |
| 7. VEHICLE MAKE/MODEL | ∿∿∿∿ |

RECORD DMV98765

| FIELD | DATA |
|---|---|
| 1. VIN | /////// |
| 2. TRANSACTION AGENT | /////// |
| 3. REPORTED PURCHASE DATE | /////// |
| 4. REPORTED PURCHASE PRICE | /////// |
| 5. SALES TAX PAID | /////// |
| 6. REGISTRATION FEE PAID | /////// |
| 7. TITLE FEE PAID | /////// |
| 8. LIENHOLDER | /////// |
| 9. AMOUNT OF LIEN | /////// |
| 10. DATE OF RECEIPT OF REGISTRATION FEE | /////// |
| 11. DATE OF RECEIPT OF TITLE FEE AND SALES TAX | /////// |
| 12. VEHICLE MAKE/MODEL | /////// |

40

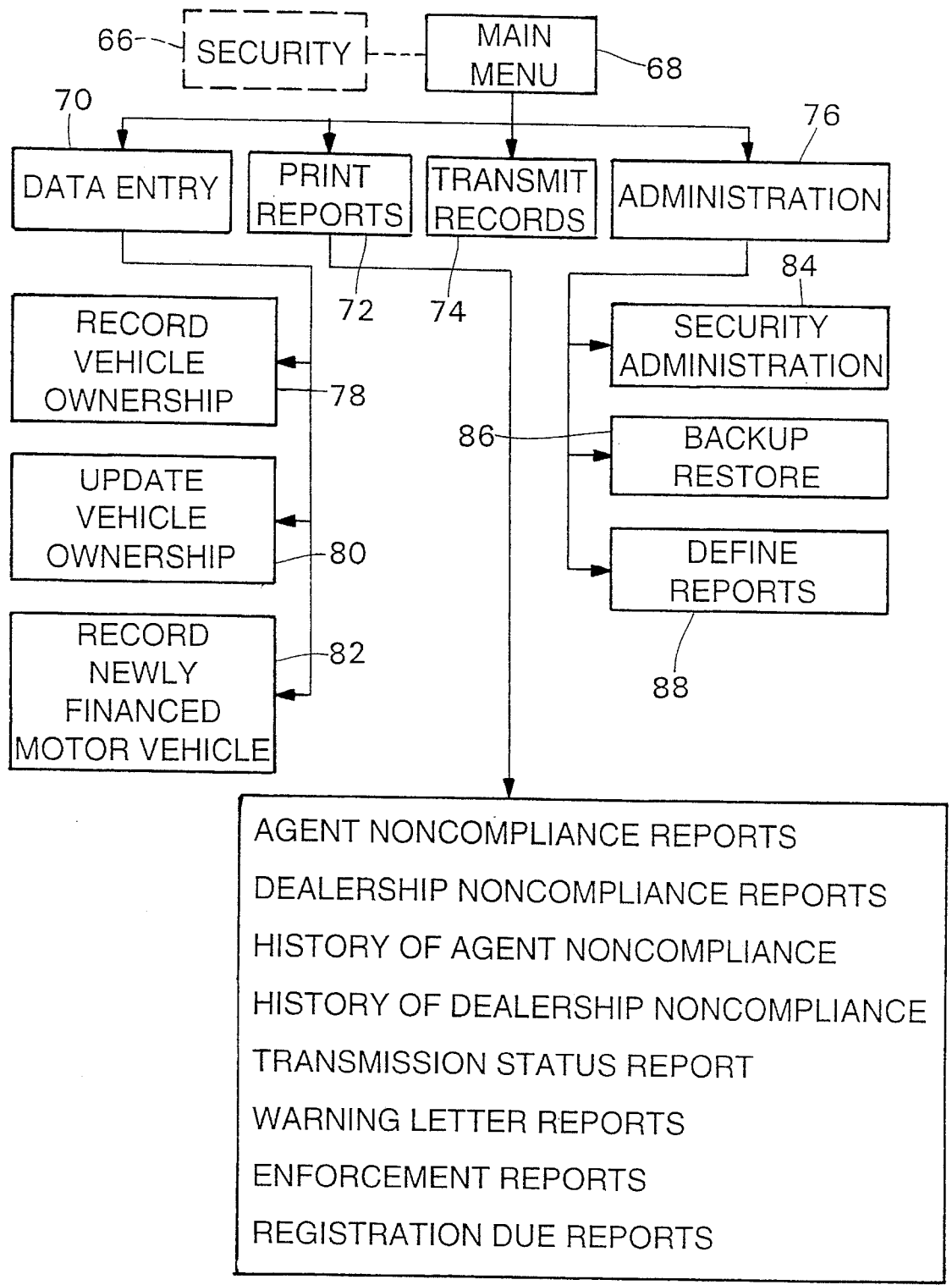

Fig. 6

```
DEPARTMENT OF MOTOR VEHICLES
          STATE YZ
    STATE CAPITOL, YZ 12345

MAY 7, 1995

WARNING -- OFFICIAL NOTICE: 30 DAY LETTER
```

DEALERSHIP XYZ           REF. NO. 12345
123 STREET ROAD
ANYTOWN, YZ 12399

According to DMV records, title and registration documents, including remittance of applicable Sales Tax and Registration Fees on the following motor vehicles sold by you more than <u>30 days</u> ago has not been received:

| Vehicle Identification Number | Date of Sale |
|---|---|
| 1. 2J4FY19E5KJ161596 | 3/24/95 |
| 2. 1HGEG854XNL034238 | 3/24/95 |
| 3. 1FABP36X9DK131244 | 3/26/95 |

DMV wishes to remind you that all title and registration documents must be received no later than 20 days after the sale date. Title 75 of the State Statute calls for the imposition of fines and/or penalties including the suspension of your ability to issue temporary registration plates.

If you are experiencing a problem with complying with these requirements, or if you have any questions regarding this notice, please contact the DMV at (987) 654-3210. If you have recently sent in the documents, please ignore this letter.

Thank you for your assistance.

Very truly yours,
Responsible Party

SYSTEM FOR PROACTIVELY AND PERIODICALLY IDENTIFYING NONCOMPLIANCE WITH MOTOR VEHICLE REGISTRATION LAWS

FIELD OF THE INVENTION

The present invention relates generally to a system for identifying instances of noncompliance with motor vehicle registration and titling laws, and more particularly to a system for identifying instances of noncompliance by agents of a purchasing consumer who are responsible for performing registration and titling.

BACKGROUND OF THE INVENTION

In many state, local and federal jurisdictions, the purchase of a motor vehicle, trailer or marine equipment (e.g., boat) requires the registration and/or titling (hereafter, "registration and titling") of that item with a governmental body as a means to track ownership and usage. In certain jurisdictions consumer purchasers of these items may authorize an agent to perform the registration and titling with the correct governmental body. The agent may be the selling merchant (e.g., automobile dealer), a title or tag agency, or even a notary public. In certain jurisdictions, the consumer purchaser must pay fees and/or taxes to register and title the property in the jurisdiction. Typical forms of taxes include a sales tax based on a percentage of the purchase price or an ad valorem tax. If an agent is responsible for performing the registration and titling, the agent will typically collect the appropriate amount of fees and taxes from the consumer purchaser, and will have the consumer purchaser fill out and sign any accompanying paperwork. The agent then forwards the paperwork and remits the monies to the governmental body. The governmental body has laws and regulations which specify a time frame within which all paperwork, fees and taxes must be received by the governmental body, such as twenty or thirty days after the sale date. If the consumer purchaser has entrusted the registration and titling to an agent, it is the agent's responsibility to timely comply with the laws and regulations.

Such agents sometimes fail to timely forward the registration and titling paperwork and corresponding fees and taxes to the governmental body. Occasionally, the agents completely fail to ever forward the paperwork, fees and taxes and abscond with the fees and taxes. In other instances, errors are made by the agents in remitting the appropriate amount of fees and taxes. All of the above scenarios can subject the governmental body to additional expenses due to (a) increased borrowing costs related to sums not collected or collected late, (b) costs of repeating the registration and titling process for incorrectly submitted paperwork, and (c) administrative and legal costs of detecting noncompliance and instituting collection proceedings against noncompliant agents.

Governmental bodies typically monitor compliance of agents with the laws and regulations by performing periodic checks of documents submitted by the agents, or by performing follow-up checks in response to a complaint from a consumer purchaser. Since the governmental body has no advance notice of a consumer purchase, it therefore does not know when to expect registration and titling paperwork to arrive. The compliance efforts currently in use are therefore always in reaction to prior events and are usually too little and too late to work efficiently.

Currently, communications channels exist between lenders and certain state department of motor vehicle agencies (DMVs) to allow the lenders to electronically perfect the lenders' security interest in motor vehicles. Upon origination of a loan for a motor vehicle, the lender sends a "paperless lien" to the state DMV which includes the vehicle's vehicle identification number (VIN). Some state DMVs also process "paperless titles." Upon purchase of a new, previously untitled and unregistered vehicle by a consumer, an electronic file transfer is made from the motor vehicle manufacturer to the state DMV in the form of a paperless title. The paperless title employs the VIN for vehicle identification. The paperless title reduces the preparation of a physical manufacturer's statement of origin and avoids the necessity to issue a subsequent certificate of title in the name of the consumer purchaser.

Despite the existing compliance methods of motor vehicle departments and known forms of communication between lenders, motor vehicle manufacturers and governmental computers, there is still a need for a system which can monitor compliance of property transaction agents with government laws and regulations in a more timely and efficient manner. The present invention fills this need by providing an automated computerized system for maintaining a database of property loan records provided by loan financiers, and employing information from the loan financier's records to check property registration submissions received by a governmental entity to detect missing, late or erroneous property registrations.

SUMMARY OF THE INVENTION

The present invention provides a computer-implemented method for monitoring the compliance of property transaction agents with government laws or regulations. The property transaction agents are involved in the registration or titling of properties purchased by consumers. The method comprises the steps of receiving records in a central computer from two independent sources, comparing the records to each other in the central computer and generating reports based on the comparison. More specifically, the central computer receives plural records of consumer property purchase data from one or more property loan financiers, and one or one governmental entities. The purchase data includes an identification number which is unique to each property. The central computer compares the plural records of the property purchase data to the plural records of the property registration data to identify the presence of any property purchase records having property identification numbers which do not correspond to identification numbers received from the governmental entity. A report is then generated in the central computer of the identified records to permit action to be taken against property transaction agents who were involved in the registration or titling of properties associated with the identified records for failure to comply with the government laws or regulations.

Another embodiment of the invention provides a method for monitoring the timeliness of compliance of the property transaction agents with the government laws or regulations. The records from the loan financiers further include a sale date and the records from the governmental entities further include a date of receipt by the governmental entity. For each matching record, the sale date is compared with the date of receipt by the governmental entity. The report lists the records where the agents were late in submitting the registration or titling paperwork to the governmental entity.

Another embodiment of the invention provides a method for detecting discrepancies in property data reported to the two independent entities, and reporting the discrepancies to the appropriate party.

Another embodiment of the invention provides a method for generating communications to noncompliant agents based on parameters preset by the governmental entity.

Other embodiments of the invention provide computer-implemented apparatus for performing the methods above.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawing:

FIG. 1 is a schematic block diagram of a property registration compliance monitoring system in accordance with a preferred embodiment of the present invention;

FIG. 2A shows an example of a sample record of data from a loan financier and FIG. 2B shows a sample record of data from a governmental computer, which may be employed in a preferred embodiment of the monitoring system of FIG. 1;

FIG. 5 is a flow diagram of the functions performed by the monitoring system of FIG. 1; and FIG. 6 is a sample warning letter which may be generated by information obtained from the monitoring system.

DETAILED DESCRIPTION OF PREFERRED EMBODIMENTS

Figure 3:
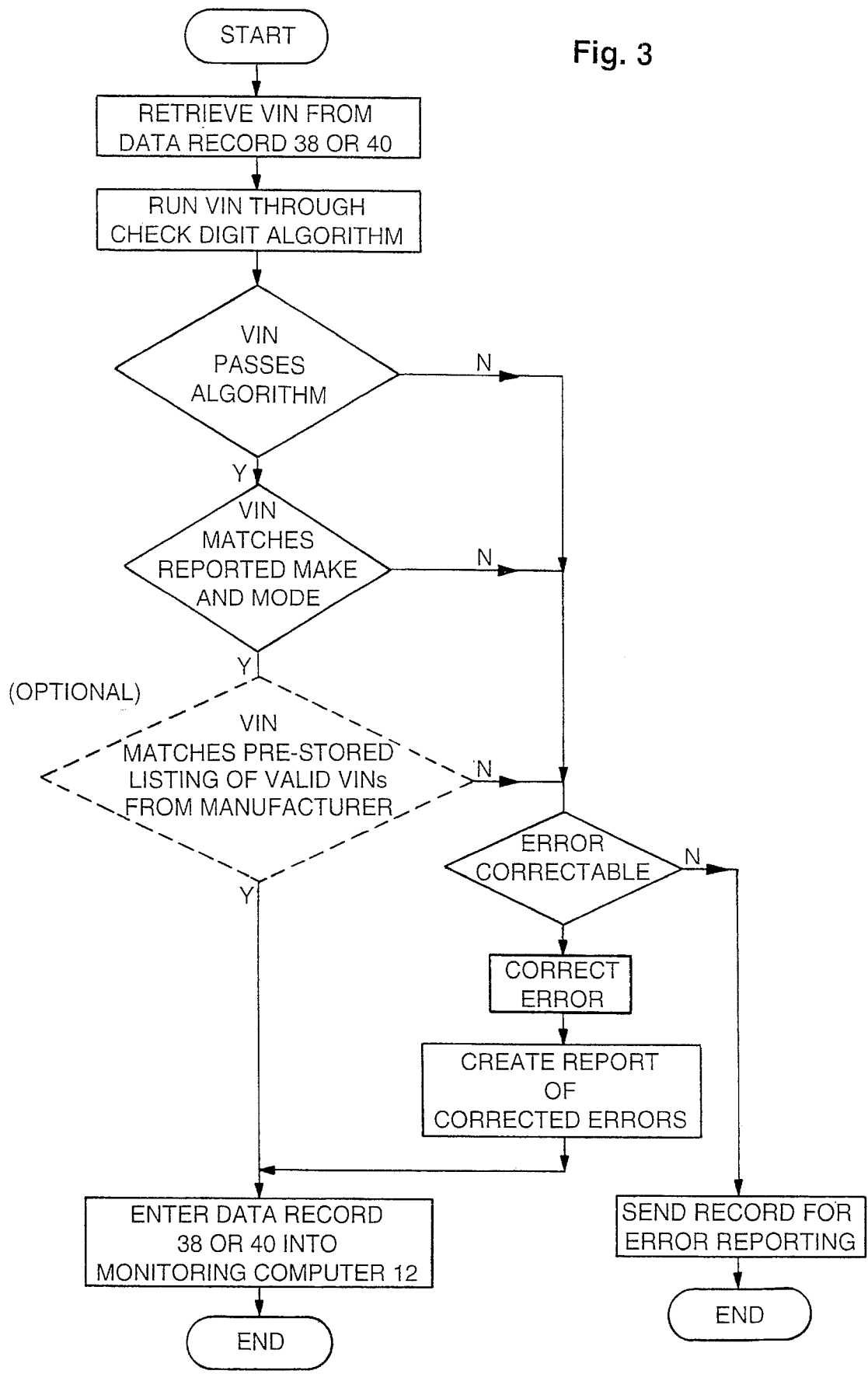
FIG. 3 is a flowchart illustrating a procedure for checking the accuracy of selected data in the records before the records are employed by the monitoring system of FIG. 1.

Certain terminology is used herein for convenience only and is not be taken as a limitation on the invention.

Referring to the drawings, wherein the same reference numerals are employed for designating the same elements throughout the several figures, there is shown in FIG. 1 a block diagram of a preferred embodiment of a system 10 for monitoring the purchase and registration of individual items of property in accordance with the present invention. The heart of the monitoring system 10 is a processor or central monitoring computer 12 which preferably includes a relational database. The monitoring computer 12 can also incorporate a number of personal computers (not shown) which act as support systems to the monitoring computer 12.

The monitoring computer 12 is bidirectionally connected through a communications link 13 to at least a state government Department of Motor Vehicle (DMV) computer 14, and, optionally, to other applicable state, local and federal government department computers, 16, 18 and 20, respectively. Typically, a state government delegates motor vehicle registration and titling functions to the state DMV which is responsible for issuing motor vehicle titles, issuing and renewing motor vehicle registrations, forwarding fees collected for such services to the state treasury, and for performing other services. Thus, the state DMV computer 14 contains a database of all registration and titling activity, including issued license plate numbers (tags) and titles, VINs, owners, temporary registrations for out-of-state markers, pending out-of-state status, and amounts of fees paid, as described more fully below in connection with FIGS. 2A and 2B. The state DMV computer 14 receives its data from registration and title applications submitted from individual motor vehicle purchasers and from transaction agents or others representing individual purchasers.

Other state, local and federal government department computers, 16, 18 and 20 also may contain motor vehicle registration information. For example, some local municipalities levy annual personal property taxes on motor vehicles which are registered in the locality. The local government computer 18 which tracks the personal property taxes typically includes certain vehicle registration information, such as the vehicle license plate, title number, vehicle make and model, vehicle identification number (VIN) and the like. Other types of state government computers may include those in the Office of the State Attorney General, the Department of Revenue, and other licensing departments. Certain federal government computers, such as computers which track federal use taxes on certain types of trucks and heavy vehicles, and computers at the National Highway Traffic Safety Administration (NHTSA) may also contain motor vehicle information for some vehicles.

The monitoring computer 12 is also bidirectionally connected to a plurality of consumer property loan financier computers 22 through a communications link 24. The loan financiers may be a commercial or other bank or savings and loan, a captive financing company (e.g., GMAC), a credit union, a commercial lending company or any other type of lending institution. A typical example of a loan financier is a commercial bank which loans a consumer money to purchase a motor vehicle from a dealer, the motor vehicle becoming collateral to secure payment of the consumer loan. To adequately protect and document the loan, the loan financier typically collects a great deal of information identifying its collateral. If the collateral is a motor vehicle, the loan financier obtains the vehicle's VIN and purchase information before releasing the loan funds. Thus, each of the loan financier computers 22 contain a database of certain loan related data, as described more fully in connection with FIGS. 2A and 2B.

The monitoring computer 12 receives new loan information from the financier computers 22 on a periodic basis, such as daily, weekly or monthly. Likewise, the monitoring computer 12 receives motor vehicle registration information from one or more of the governmental computers 14–20 on a periodic basis. The monitoring computer 12 includes a memory 26 for storing the data received from the remote computers, a data comparator 28 for performing comparisons of the data received from the financier computers 22 with the data received from the one or more governmental computers 14–20, and a report generator 30 for providing reports of the results of the comparisons. The memory 26 is preferably a direct access storage device (DASD), such as a hard disk.

The report generator 30 provides at least three types of reports for use by the governmental entities, as follows:

1. A missing government record report 32. This report lists motor vehicles which were reported to the monitoring computer 12 by the financier computers 22 as being involved in a sale transaction, but which do not match any records reported by any of the government computers 14–20. In the most common scenario, the report 32 lists motor vehicles which do not match any records provided by the state DMV computer 14, since the state DMV is the governmental entity most likely to be concerned about a failure to register a motor vehicle and pay the corresponding fees. The report 32 also lists the property transaction agent associated with each unmatched record, if the agent information is included in the report sent by the respective financier computer 22. If the property transaction agent is not provided in the record sent by the respective financier computer 22, the report 32 lists the name of the loan financier who originated the loan and the account number of the loan.

2. A late submission report 34. This report lists motor vehicles which were reported to the monitoring computer 12 by the financier computers 22 as being involved in a sale transaction, and which match a record reported by one or more of the government computers 14–20 (e.g., the state DMV computer 14), but which were received late (i.e., after a statutory deadline) by the governmental entity. The report 34 lists the property transaction agent associated with the late received records, if the agent information is known from the data provided by the financier computer 22. If the agent information is not provided in the record sent by the respective financier computer 22, the report 34 lists the name of the loan financier who originated the loan and the account number of the loan.

3. A discrepancy report 36. This report lists motor vehicles which were reported to the monitoring computer 12 by the financier computers 22, and which match a record reported by one or more of the government computers 14–20 (e.g., the state DMV computer 14), but which include one or more discrepancies in the record data. For example, a loan financier computer 22 and state DMV computer 14 may have both provided a record for a motor vehicle having the same VIN number, but the sale date reported by the financier computer 22 may differ substantially from the sale date reported by the state DMV computer 14. In another example, a loan financier computer 22 may have provided lien data (i.e., amount financed) which differs substantially from the amount of the lien reported by the state DMV computer 14. To investigate the source of the discrepancies, the report 36 lists the property transaction agents associated with the records (if the agents are known), as well as the governmental computer which provided the government record data. If the agent is not known, the report 36 lists the name of the loan financier who originated the loan and the account number of the loan.

Other types of reports desired by the governmental entities may be generated based on the data in the memory 26.

In one preferred embodiment of the invention, the report generator 30 also produces reports 37 in the form of noncompliance warning letters. The reports 37 are actually customized letters or communications which contain subsets of information in one or more of the reports 32, 34, 36 and which pertain to the same transaction agent or financier. The report generator 30 employs preset parameters from a parameter file 31 to produce the letters or communications. The same or different parameters may be employed for generating the reports 32, 34, 36. The parameter setting feature is described in more detail below with respect to FIGS. 5 and 6.

FIG. 2A shows an example of a sample financier record 38 of consumer property purchase data forwarded by the loan financier computers 22 to the monitoring computer 12. FIG. 2B shows a sample government record 40 of property registration data forwarded from a state DMV computer 14 to the monitoring computer 12.

The sample record 38 includes the motor vehicle's VIN, the dealer who sold the motor vehicle to the consumer (i.e., the selling merchant), the purchase date, amount financed, lienholder, loan account number, and vehicle make and model. Typically, the dealer acts as the transaction agent for the consumer to forward the registration and title paperwork to the state DMV. Thus, the dealer physically collects the appropriate taxes and fees from the consumer as part of the purchase transaction and forwards the paperwork and monies to the state DMV on behalf of the consumer. Thus, the state DMV presumes from record 38 that the dealer is the transaction agent. Sometimes, however, loans are originated directly between a loan financier and the consumer, with no involvement by a dealer. In such a transaction, a title and tag (i.e., registration) agent or notary may act as the transaction entity for processing the registration and title paperwork and collecting and forwarding the appropriate fees. Accordingly, the record 38 may not include any of the information regarding the dealer. However, the lienholder data and loan account number is generally still provided.

The sample record 40 includes the motor vehicle's VIN, the transaction agent (who could be the dealer), the reported purchase price and date, sales tax paid, registration fee paid, title fee paid (if any), date of receipt of registration fee, date of receipt of title fee, date of receipt of sales tax, lienholder, amount of lien, and vehicle make and model. The state DMV receives such information from the registration and title paperwork forwarded from registration agents.

The state DMV also receives out-of state temporary registration paperwork from registration agents. If a consumer from State X purchases a motor vehicle from a dealer in State Y, the dealer in State Y issues an out-of-state temporary registration and forwards a copy of the paperwork to the state DMV in State Y. If the monitoring computer 12 for a system 10 in State Y subsequently receives a record from a loan financier computer 22 for the motor vehicle which includes a VIN that matches the VIN of an out-of-state temporary registration, the report generator 30 does not include the match in its missing record report 32 because the motor vehicle is expected to be legally registered and titled in State X.

The sample records 38 and 40 need not include all of the information listed. However, in the preferred embodiment of the invention, certain minimum information is required to allow the monitoring computer 12 to perform record comparisons and generate the reports 32, 34, 36 and 37. The required minimum information includes the VIN, transaction agent or lienholder/loan account number, purchase date as reported by the financier computer 22, and date of receipt of paperwork at the DMV. Since every motor vehicle manufactured in the world contains a unique VIN, and since virtually all records in government motor vehicle registration computers include VINs, the VIN provides a preferred data field for comparing records in the data comparator 28. The remaining required information is necessary to identify transaction agents who did not submit registration and title paperwork, or who submitted the paperwork in an untimely manner.

If the transaction agent is unknown from the record 38 because the dealer data field is blank, and the data comparator 28 identifies a VIN in a record 38 which does not match the VIN in any records 40, the lienholder data and loan account number data is employed to notify the loan financier who provided the record 38 that the motor vehicle associated with the account number was not properly registered or titled. Since registration and titling may be important to perfect the security interest of the lienholder, the lienholder is motivated to notify the consumer purchaser and inquire as to the status of the registration and title paperwork. If the consumer purchaser entrusted the registration and title paperwork to a title/tag agent or notary public, the loan financier may report such facts to the state DMV for further follow-up action by the state DMV. It should be understood, however, that the consumer purchaser is ultimately responsible for payment of all taxes and fees. Thus, if the problem of late receipt or non-receipt of taxes and fees by the consumer purchaser's agent cannot be resolved, the state DMV may ultimately take action directly against the consumer purchaser.

The data entries in the records 38 and 40 are typically initially obtained from manual paperwork. Since VINs are composed of long strings of alphanumeric characters, errors often occur when the VINs are manually entered into a computer. As described above, the comparison of records 38 against records 40 relies heavily on matching VINs. Thus, it is very important that erroneously reported VINs are corrected before the records 38 and 40 are sent to the data comparator 28.

FIG. 3 is a flowchart illustrating a preferred embodiment of a procedure for checking the accuracy of the VINs before a record 38 or 40 is entered into the monitoring computer 12 and subjected to comparisons by the data comparator 28.

Every motor vehicle has a unique VIN containing seventeen alphanumeric characters. The first eleven alphanumeric characters identify the manufacturer, plant, engine type, year, make and model of the motor vehicle, among other vehicle characteristics. Thus, a plurality of vehicles may have the same first eleven alphanumeric characters. However, the remaining six digits of each VIN are different for every of vehicle of the same manufacturer, plant, engine type, year, make and model.

The first step in the VIN checking procedure is to perform a check digit algorithm on the entire VIN to ensure that no "false negative" errors occur in the data comparator 28. As is well-known in the art, the alphanumeric characters of VINs are selected so as to be verifiable by such a check digit algorithm. If the VIN passes the check digit algorithm, the second step is to verify that the make and model encoded in the VIN matches the make and model reported in the record. An optional third step may be performed which includes comparing the VIN against a prestored range of valid VIN numbers provided by the manufacturers. If the VIN passes all of the provided steps, the record 38 or 40 is entered into the memory 26 of the monitoring computer 12 for subsequent data comparisons by the data comparator 28. If the VIN fails any of the tests, the error is analyzed to determine whether it can be corrected. Some VIN errors, such as transposition errors, are correctable. If the error cannot be corrected, the record may still be entered into the memory 26 but is flagged for error reporting and is not processed by the data comparator 28.

Figure 4:
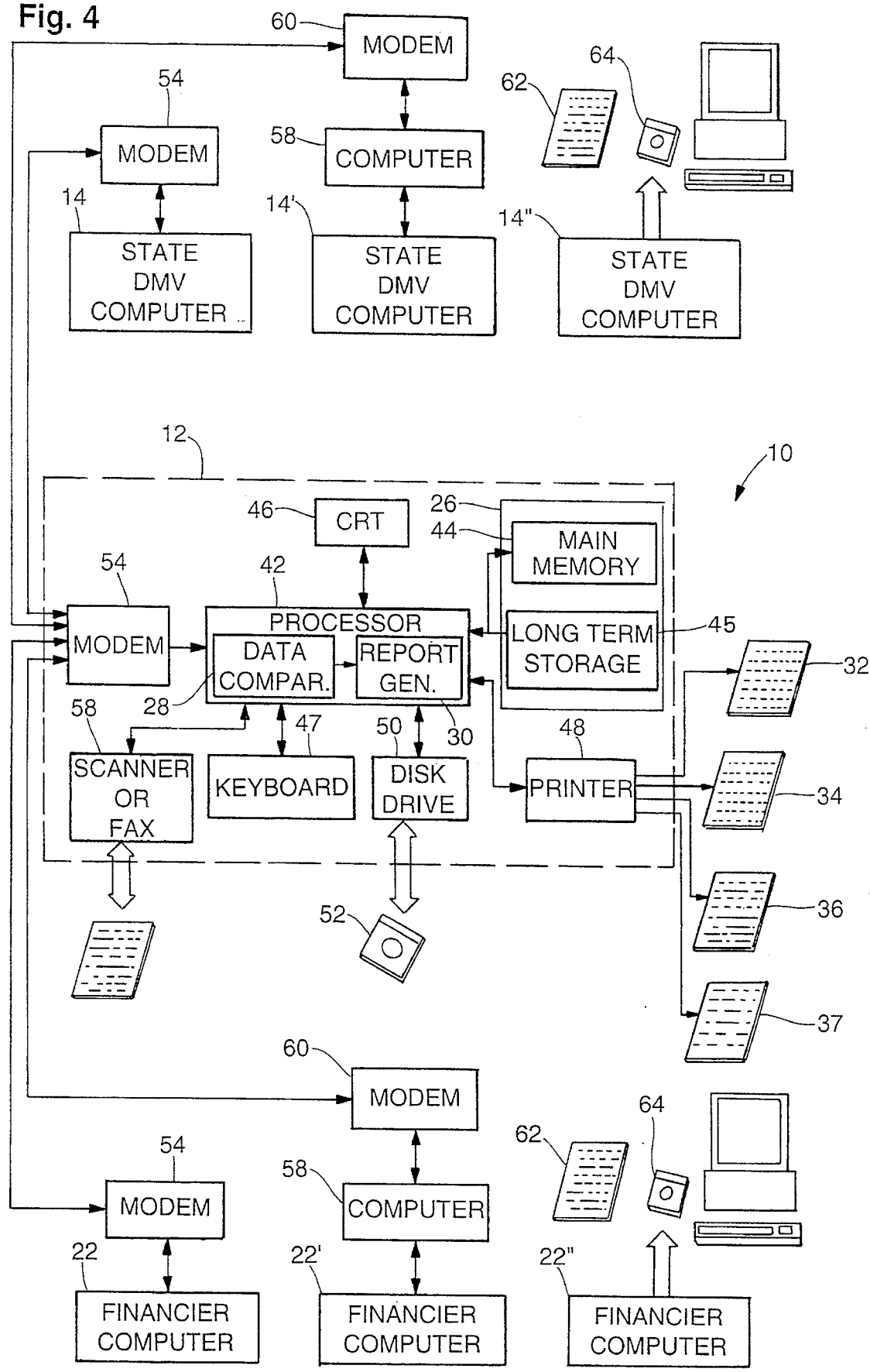
FIG. 4 is more detailed schematic block diagram of the monitoring system of FIG. 1.

FIG. 4 shows further details of the monitoring system 10 of FIG. 1 wherein the central monitoring computer 12 communicates with a state DMV computer 14 and one loan financier computer 22. FIG. 4 also shows further details of the communications link 13 between the state DMV computer 14 and the central monitoring computer 12, and the communications link 24 between a loan financier computer 22 and the central monitoring computer 12.

The central monitoring computer 12 includes a main processor 42. The processor 42 may be a mainframe computer, mid-range computer or personal computer. One suitable computer is an IBM AS/400 mid-range computer. The main processor 42 preferably has adequate power to receive and process information, such as records 38 and 40, from a large number of different sources. The data comparator 28 and report generator 30 shown in FIG. 1 are associated with the main processor 42.

Financier information, such as records 38, transmitted by a financier computer 22 and government information, such as records 40, transmitted by the state DMV computer 14 are received by the monitoring computer 12 and routed to the memory 26. The information is first routed to a main memory 44 of the memory 26. The main memory 26 is a volatile memory which temporarily stores the information which is currently being inputted into the processor 42. The main memory is preferably, but not necessarily, a semiconductor memory. Once the information is checked for accuracy and other formalities, and processed by the data comparator 28, the information is stored in a long-term memory 44. The long-term memory 44 is preferably a non-volatile memory, such as a hard disk, magnetic tape, PROM or floppy disk. The long-term memory 44 may be periodically purged of information which is no longer needed, for example, records 38 which match timely filed records 40. The purged information may be archived onto an external storage device (not shown).

The monitoring computer 12 also includes a CRT 46 attached to the processor 42 for allowing a user to view a particular piece of information on the CRT 46 display screen. The monitoring computer 12 also includes a keyboard 47 for allowing a user to enter data, request information to be viewed, and interact with the processor 42. The keyboard is a conventional ASCII keyboard, or the like.

The communications link 13 between the state DMV computer 14 and the central monitoring computer 12, and the communications link 24 between a loan financier computer 22 and the central monitoring computer 12 may take a variety of different forms. Accordingly, the computers 12, 14 and 22 include a plurality of different types of input/output interfaces, such as printers, disk drives, modems and scanners. More specifically, the monitoring computer 12 includes a printer 48 for printing out the reports 32, 34, 36 or 37 in hard copy format, a disk drive 50 for outputting the report information onto a disk 52, a modem 54 connected to the computers 14 and 22, and a scanner or fax machine 58.

In a first embodiment of the invention, the state DMV computer 14 and the financier computer 22 communicate with the monitoring computer 12 via standard modems 54 at each computer. In an alternative embodiment of the invention, the state DMV computer 14' and the financier computer 22' communicate with the monitoring computer 12 via a second computer 58 and modem 60 arrangement. The second computer 58 sends and receives information to and from the state DMV computer 14' and financier computer 22', respectively, by any conventional means, such as, but not limited to, direct data link, a floppy disk, magnetic tape or manual input. In yet another embodiment of the invention, the state DMV computer 14" and the financier computer 22" communicate with the monitoring computer 12 via hard copy reports 62 or disks 64 generated by the computers 14" and 22".

It should be further understood that the communication means between each pair of computers, as well as the communication means from each pair of computers and to each pair of computers, may be intermixed. For example, the financier computer 22 may communicate with the monitoring computer 12 via modems 54, whereas the monitoring computer 12 may communicate with the financier computer via disks 52. Likewise, the state DMV computer 14 may communicate with the monitoring computer via modems 54, whereas the monitoring computer 12 may communicate with the state DMV computer 14 via hard copy versions of the reports 32, 34, 36 and 37. It should also be understood that the hardware and communications means described with respect to the state DMV computer 14 is the same as that associated with other government computers (not shown) which may communicate with the monitoring computer 12.

As is evident by the foregoing discussion, there are a number of different types of users which are associated with the monitoring system 10. A first type of user, a "direct access user," is generally an employee or agent of an entity operating the monitoring computer 12 and has physical or direct access to the information in the monitoring computer 12. The direct access user is responsible for coordinating receipt of information from all remote computers and sending the appropriate information to the remote computers. The direct access user is also able to update and delete information in the memory 26 of the monitoring computer 12.

A second type of user is a subscriber at one of the government computers 14–20 or financier computers 22. Unlike the direct access user who has generally unlimited access to information in the monitoring computer 12, the subscriber only has access to selected information in the monitoring computer 12. For example, a subscriber associated with the state DMV computer 14 has access to selected information regarding financed motor vehicles which are either missing from DMV records or which were reported late to the DMV. If a motor vehicle is timely registered and titled in the DMV, as detected in the monitoring computer 12, the state DMV subscriber does not have access to specific details of the transaction, as reported to the monitoring computer 12 by the financier computer 22. Likewise, a subscriber associated with the financier computer 22 may have access to selected information reported from the state DMV only when the state DMV needs the financier's assistance in discovering who the purchasing consumer or transaction agent is for a given motor vehicle purchase.

FIG. 5 shows a general block diagram depicting the functions which can be performed by the monitoring system 10 of FIG. 4.

To log onto the monitoring computer 12, the direct access user or subscriber must first be validated by security 66. A direct access user or subscriber wishing to gain access to the monitoring computer 12 must enter a proper identification (ID) code. The ID code is validated by the monitoring computer 12 by comparing the inputted ID code with a table of acceptable codes stored in the main memory 44. In the preferred embodiment, a subscriber who wishes to gain access to the monitoring computer 12 must enter the proper ID code, along with an additional code identifying either the financier or the government agency with which the subscriber is associated.

Once the direct access user or subscriber has successfully entered the monitoring computer 12, a main menu 68 appears on the CRT 46 of the monitoring computer 12 or the CRT of the financier or government computer (not shown). The main menu 68 provides a visual display of the various functions which can be performed by the monitoring system 10, depending on the category and type of direct access user or subscriber. The functions include data entry 70, report printing 72, record transmitting 74 and administration 76.

If data entry 70 is selected, a new screen appears listing the possible functions which can be selected by the direct access user or subscriber. The possible functions include recording or updating a government record of ownership of a motor vehicle (e.g., entering a new registration and application for certificate of title, updating an existing registration and title), and recording a newly financed motor vehicle. To record or update a government record of ownership, the subscriber enters some or all of the data shown in FIG. 2B for a record 40. To record a newly financed motor vehicle, the subscriber enters some or all of the data shown in FIG. 2A for a record 38.

If print reports 72 is selected, a new screen appears listing the possible types of reports which can be selected by the direct access user or subscriber. The possible reports include current and historical reports of noncompliance by dealerships and other transaction agents, warning letter and enforcement reports, reports of transmission status (e.g., transmission successfully completed, aborted, etc . . . ), and registration due reports. Current reports of noncompliance include instances of late submissions of paperwork, as well as instances where there was no submission of paperwork. Late submission reports may be further separated into submissions which were late by predetermined time periods (e.g., ten days, thirty days, sixty days). Registration due reports provide a governmental subscriber, such as the state DMV, with selected information from each record reported to the monitoring computer 12 by the financier computer 22. The registration due reports are generated periodically (e.g., daily or weekly) to inform the governmental subscriber of reported consumer purchases, thereby allowing the subscriber to immediately or almost immediately know what registration and title paperwork it should expect to receive and when it should expect to receive it. The governmental subscriber may employ such periodic reports to estimate workload requirements or expected revenue, or for any other management purpose.

If transmit records 74 is selected, the direct access user or subscriber transmits files containing a plurality of inputted or flagged records, such as records 38 and 40 to the appropriate computer.

If administration 76 is selected, a new screen appears which allows a direct access user or subscriber to select either security administration 84, backup restore 86 or define reports 86. If security administration 84 is selected, the direct access user is able to add, delete or change security access parameters of a particular subscriber, or of another direct access user. The changeable parameters include, but are not limited to, subscriber name, direct access user name, subscriber ID code, direct access user ID code, and access level permitted to the direct access user or subscriber. If backup restore 86 is selected, appropriate backup of data stored in the respective computer is performed. If define reports 88 is selected, the direct access user or subscriber can define parameters of the reports and the parameters which trigger the generation of a noncompliance warning letter.

The ability of the direct access user or subscriber to define the parameters of the reports, and thus adjust the data included in the various reports, is an important feature of the invention. In one preferred embodiment of the invention discussed briefly above with respect to FIG. 1, the entity managing the monitoring computer 12 automatically sends out communications, such as warning letters, to noncompliant transaction agents based upon the parameters defined by the direct access user or subscriber. The subscriber then receives reports of which communications were sent by the managing entity. Two examples of types of parameters which a direct access user or subscriber may define are as follows:

1. Number of instances of noncompliance by the same transaction agent within a given time frame which triggers a warning notice.

2. Number of days late in forwarding paperwork to trigger a reportable instance of noncompliance.

For example, the subscriber may set parameters in the monitoring computer 12 so that warning letters are only communicated to transaction agents who have had more than two occurrences of lateness or nonreceipt of paperwork within a one month period. Thus, the subscriber may set the parameters to be very tight or very loose, and can make periodic adjustments to the parameters as it sees fit. It should be appreciated that each warning letter is, in effect, a report in the form of a customized letter which contain subsets of information in one or more of the reports 32, 34, 36 and which pertain to the same transaction agent or financier. It should also be appreciated that the same or different parameters employed for generating reports 37 in the form of letters may be employed for generating the reports 32, 34, 36. In the example above, warning letters are only communicated to transaction agents who have had more than two occurrences of lateness or nonreceipt of paperwork within a one month period. However, a report to the state DMV may be more thorough, listing all occurrences of lateness or nonreceipt of paperwork within a one month period.

FIG. 6 is a sample warning letter 90 which may be generated by information obtained from the monitoring system 10 of FIG. 4 in the following manner:

1. At periodic intervals, the processor 42 of the monitoring computer 12 retrieves from memory 26 all records 38 received from the financier computers 22 for motor vehicles having a purchase date within a desired range. Likewise, the processor 42 retrieves from the memory 26 all records 40 of new motor vehicle registrations and titles received from the state DMV computer 14 subsequent to the beginning of the desired date range. In the example shown in FIG. 6, at the beginning of May 1995, the processor 42 of the monitoring computer 12 retrieves from memory 26 all records 38 received from the financier computers 22 for motor vehicles having a purchase date in March 1995. Likewise, the processor 42 retrieves from the memory 26 all records 40 of new motor vehicle registrations and titles received from the state DMV computer 14 since Mar. 1, 1995.

2. Each record 38 is compared to the set of records 40 to detect a match in the VIN of the record 38. If no match is found, the record 38 is flagged for further action.

3. If the unmatched record 38 includes dealer information, the dealer name, VIN and date of sale is included in missing record report 32.

4. The missing record report 32 is forwarded to the state DMV for generation and mailing of warning letters. Alternatively, the state DMV directly authorizes the entity managing the monitoring computer 12 to send out the warning letters, as described further below.

If the dealer information is missing, the state DMV may forward a notice to the financier requesting that the financier provide the identification of the consumer purchaser to the state DMV for further attention. Alternatively, the state DMV may request that the financier contact the consumer purchaser to attend to the late registration. Ultimately, the state DMV should be able to learn who, if anyone, acted as the property transaction agent for the consumer purchaser, and can then take appropriate action against the agent.

Another type of letter which may be generated and sent by the monitoring computer 12 would inform a transaction agent that they have forwarded paperwork to the governmental entity in an untimely manner. The letter may either warn the transaction agent regarding their duty to make timely submissions or the letter may formally communicate a fine or penalty for the late submissions.

As noted above, in one preferred embodiment of the invention, the state DMV directly authorizes the entity managing the monitoring computer 12 to send out the warning letters, and other forms of communication to noncompliant transaction agents and to financiers. Thus, in one preferred embodiment of the invention, the entire process of collecting and comparing records, following up on problem records, and reporting the follow-up to subscribers is automatically performed by the monitoring computer in accordance with parameters set by the subscriber. In the example shown in FIG. 6, the subscriber sets the parameters in the monitoring computer 12 so that warning letters are only communicated to transaction agents who have had more than two occurrences of lateness or nonreceipt of paperwork within a one month period. The invention thus provides a computerized monitoring system which proactively monitors expected filings of registration and title applications. Heretofore, it was impossible for the governmental entity to perform such a function, even manually, because it had no indication of any consumer purchase activity. In the current invention, the information provided by the financier computers is an indication of such consumer purchase activity.

The preferred embodiment of the invention relies upon a VIN for checking and verifying registrations. However, the use of other types of identification numbers are within the scope of the invention. For example, boat hull numbers may be employed for checking and verifying boat registrations. Furthermore, the invention is equally useful for checking and verifying registrations of other types of vehicles, such as trailers, mobile homes, campers, aircraft and watercraft.

The preferred embodiment of the invention employs the reports to generate "communications" in the form of warning and violation letters. However, it is within the scope of the invention to employ the reports to facilitate and prepare other forms of "communications" to the appropriate parties, such as faxes, telephone calls and the like.

Although the preferred embodiment of the invention is described above in the context of monitoring compliance with state DMV laws and regulations, the invention is equally applicable to monitoring compliance with other state, local and federal registration laws. As described above, some local municipalities levy annual personal property taxes on motor vehicles which are registered in the locality. Even if a record from a financier computer 22 correctly and timely matches a record from a state DMV computer 14, the motor vehicle might still not be properly registered in the local municipality. Local municipalities typically discover unregistered vehicles by matching their records against state DMV records. The monitoring system 10 provides an alternative method for uncovering such unregistered vehicles by comparing records in a local government computer 18 to a database from financier computers 22.

The embodiment described above can significantly reduce the incidents of late or nonreceipt of payments due to the government for purchasing certain types of property. In the case of nonreceipt of payments, the invention significantly improves the ability of the government to locate and collect the payments. In the case of late receipt of payments, the invention allows the state to reduce its costs of borrowing because more payments will be made in a timely manner.

The invention allows a governmental entity such as a state DMV to move from a cash basis to an accrual basis. That is, instead of operating in a mode where fees and taxes are accounted for only when actually received (cash basis), the governmental entity can proactively track such fees and taxes according to when they are due, even though all of the fees and taxes may not have been actually paid or received, and thus can operate on an accrual basis. The registration due reports are ideally suited for this purpose since they can provide to the governmental entity information regarding expected revenue.

The invention is not limited to monitoring compliance with motor vehicle and boat registration and titling laws. The invention is equally adaptable to any system wherein government laws or regulations require the prompt payment of fees or taxes on property acquisitions, and wherein an independent source of data exists pertaining to the acquired property.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A computer-implemented method for proactively and continuously monitoring the compliance of property transaction agents with government laws or regulations, the property transaction agents being involved in the registration or titling of properties purchased by consumers, the government laws or regulations requiring payment of sales tax or registration fees, on the property, the method comprising the steps of:

(a) receiving on a periodic basis in a central computer,
      (i) plural records of consumer property purchase data from one or more property loan financiers, the purchase data including an identification number which is unique to each property and the name of the property transaction agent associated with the property purchase, and
      (ii) plural records of property registration data from one or more governmental entities, the registration data also including an identification number which is unique to the property;
   (b) comparing at periodic intervals in the central computer, the plural records of the property purchase data to the plural records of the property registration data to identify the presence of any property purchase records having property identification numbers which do not correspond to property identification numbers received from the governmental entity;
   (c) generating a report in the central computer of the identified records to permit action to be taken against property transaction agents who were involved in the registration or titling of properties associated with the identified records for failure to pay the sales tax or registration fees, the report including the named property transaction agent; and
   (d) defining in the central computer a set of parameters for flagging identified records which require immediate attention,
   wherein the step of generating the report includes automatically generating communications to the identified property transaction agents associated with the flagged records to remind the agents to pay the sales tax or registration fees.

2. A computer-implemented method for proactively and continuously monitoring the compliance of property transaction agents with government laws or regulations, the property transaction agents being involved in the registration or titling of properties purchased by consumers, the property transaction agents being selected from the group comprising title agents, tag agents, motor vehicle dealerships, marine equipment dealerships, and notary publics, the method comprising the steps of:

(a) receiving on a periodic basis in a central computer,
      (i) plural records of consumer property purchase data from one or more property loan financiers, the purchase data including an identification number which is unique to each property, and the name of the property transaction agent associated with the property purchase, and
      (ii) plural records of property registration data from one or more governmental entities, the registration data also including an identification number which is unique to the property;
   (b) comparing at periodic intervals in the central computer, the plural records of the property purchase data to the plural records of the property registration data to identify the presence of any property purchase records having property identification numbers which do not correspond to property identification numbers received from the governmental entity; and
   (c) generating a report in the central computer of the identified records to permit action to be taken against property transaction agents who were involved in the registration or titling of properties associated with the identified records for failure to comply with the government laws or regulations, the report including the named property transaction agents.

3. A computer-implemented method for proactively and continuously monitoring the compliance of property transaction agents with government laws or regulations, the property transaction agents being involved in the registration or titling of properties purchased by consumers, the property being selected from the group comprising motor vehicles, boats, trailers, mobile homes, campers, aircraft and watercraft, the method comprising the steps of:

(a) receiving on a periodic basis in a central computer,
      (i) plural records of consumer property purchase data from one or more property loan financiers, the purchase data including an identification number which is unique to each property, the property identification number being selected from the group comprising a vehicle identification number (VIN) and a boat hull number, and
      (ii) plural records of property registration data from one or more state motor vehicle departments, the registration data also including an identification number which is unique to the property;
   (b) comparing at periodic intervals in the central computer, the plural records of the property purchase data to the plural records of the property registration data to identify the presence of any property purchase records having property identification numbers which do not correspond to property identification numbers received from the state motor vehicle departments; and
   (c) generating a report in the central computer of the identified records to permit action to be taken against property transaction agents who were involved in the registration or titling of properties associated with the identified records for failure to comply with the government laws or regulations.

4. A computer-implemented method for proactively and continuously monitoring the timeliness of compliance of property transaction agents with government laws or regulations, the property transaction agents being involved in the registration or titling of properties purchased by consumers, the method comprising the steps of:

(a) receiving on a periodic basis in a central computer
   (i) plural records of consumer property purchase data from one or more property loan financiers, the purchase data including an identification number which is unique to each property and a sale date, and
   (ii) plural records of property registration data from one or more governmental entities, the registration data also including an identification number which is unique to the property, the registration data further including a date of receipt by the governmental entity;

(b) comparing at periodic intervals in the central computer, the plural records of the property purchase data to the plural records of the property registration data to detect the presence of any property purchase data records having property identification numbers which match the records received from the governmental entity, and comparing the sale date of the matched records to the date of receipt; and (c) generating an overdue report in the central computer of the matched records wherein the date of receipt is a predetermined time period past the sale date to permit action to be taken against the property transaction agents who were involved in the registration or titling of the properties in the overdue report for untimely compliance with the governmental laws or regulations.

5. A method according to claim 4 wherein the purchase data further includes the name of the property transaction agent associated with the property purchase, the report in step (c) including the named property transaction agent.

6. A method according to claim 5 wherein the government laws or regulations require payment of taxes or fees on the property, the method further comprising the step of (d) defining in the central computer a set of parameters for flagging identified records which require immediate attention, wherein the step of generating the report includes automatically generating communications to the identified property transaction agents associated with the flagged records to remind the agents to timely pay the taxes or fees.

7. A method according to claim 6 wherein the taxes or fees comprise sales tax or registration fees, respectively.

8. A method according to claim 5 further comprising the step of (d) defining in the central computer a set of parameters for flagging identified records which require immediate attention, wherein the step of generating the report includes automatically generating compliance reminder communications to the identified property transaction agents associated with the flagged records.

9. A method according to claim 5 further comprising the step of (d) defining in the central computer a set of parameters for flagging identified records which require immediate attention, wherein the step of generating the report includes automatically generating communications regarding fines or penalties due from the identified property transaction agents associated with the flagged records.

10. A method according to claim 5 wherein the property transaction agents are selected from the group comprising title agents, tag agents, motor vehicle dealerships, marine equipment dealerships, and notary publics.

11. A method according to claim 4 wherein the property is selected from the group comprising motor vehicles, boats, trailers, mobile homes, campers, aircraft and watercraft.

12. A method according to claim 11 wherein the governmental entity is state motor vehicle department.

13. A method according to claim 11 wherein the property identification number is selected from the group comprising a vehicle identification number (VIN) and a boat hull number.

14. A method according to claim 4 wherein the purchase data further includes the name of the financial institution associated with the property purchase and the account number associated with the property purchase, the report in step (c) including the named financial institution and account number.

15. A computer-implemented apparatus for proactively and continuously monitoring the timeliness of compliance of property transaction agents with government laws or regulations, the property transaction agents being involved in the registration or titling of properties purchased by consumers, the apparatus comprising a central processor, a plurality of remote loan financier computers containing records of consumer property purchase data including a sale date, at least one government computer containing records of property registration data including a date of receipt by the government of registration or titling paperwork, a first communication link between the processor and the plurality of loan financier computers, and a second communication link between the processor and the government computer, the central computer including (a) a storage device for storing records of consumer property purchase data sent on a periodic basis from the plurality of remote loan financier computers through the first communication link, and records of property registration data sent on a periodic basis from the government computer;

(b) a database comparator connected to the storage device for comparing at periodic intervals the records of the property purchase data to the records of the property registration data to identify the presence of any property purchase records which match the records received from the governmental entity, and which have a sale date which is at least a predetermined time period before the date of receipt by the government; and (c) a report generator connected to the database comparator for generating a report of the identified records to permit action to be taken against property transaction agents who were involved in the registration or titling of properties associated with the identified records for failure to timely comply with the government laws or regulations.

16. A computer-implemented apparatus according to claim 15 wherein each record of consumer property purchase data and each record of property registration data includes an identification number which is unique to the property, the database comparator employing the unique property identification number to identify non-matching records of property purchase data.

17. A computer-implemented apparatus according to claim 15 wherein at least some of the records of consumer property purchase data include the name of the property transaction agent associated with the property purchase, the report including the named property transaction agent associated with the non-matching records.

18. A computer-implemented method for proactively and continuously monitoring and communicating instances of noncompliance of property transaction agents with government laws or regulations, the property transaction agents being involved in the registration or titling of properties purchased by consumers, the method comprising the steps of:

(a) receiving on a periodic basis in a central computer,
  (i) plural records of consumer property purchase data from one or more property loan financiers, the purchase data including an identification number which is unique to each property, at least some of the records also including the name of the property transaction agent associated with the property purchase, and
  (ii) plural records of property registration data from one or more governmental entities, the registration data also including an identification number which is unique to the property;

(b) comparing at periodic intervals in the central computer, the plural records of the property purchase data to the plural records of the property registration data to identify the presence of any property purchase records having property identification numbers which do not correspond to property identification numbers received from the governmental entity;

(c) defining in the central computer a set of parameters for flagging identified records which require immediate attention; and (d) automatically generating noncompliance warning communications in the central computer to property transaction agents associated with flagged records and who can be identified from the records of consumer property purchase data for failure to comply with the government laws or regulations.

19. A method according to claim 18 wherein step (d) is performed on a periodic basis.

20. A computer-implemented apparatus for proactively and continuously monitoring and communicating instances of noncompliance of property transaction agents with government laws or regulations, the property transaction agents being involved in the registration or titling of properties purchased by consumers, the apparatus comprising a central processor, a plurality of remote loan financier computers containing records of consumer property purchase data, at least one government computer containing records of property registration data, a first communication link between the processor and the plurality of loan financier computers, and a second communication link between the processor and the government computer, the central computer including (a) a storage device for storing records of consumer property purchase data sent on a periodic basis from the plurality of remote loan financier computers through the first communication link, and records of property registration data sent on a periodic basis from the government computer;

(b) a database comparator connected to the storage device for comparing at periodic intervals the records of the property purchase data to the records of the property registration data to identify the presence of any property purchase records which do not correspond to any records received from the governmental entity;

(c) a parameter file for setting parameters for flagging identified records which require immediate attention; and (d) a warning communications generator for automatically generating noncompliance warning communications to property transaction agents associated with flagged records and who can be identified from the records of consumer property purchase data for failure to comply with the government laws or regulations.

* * * * *